United States Patent [19]

Novotny

[11] Patent Number: 4,733,863

[45] Date of Patent: Mar. 29, 1988

[54] CONFECTIONERY GAME

[76] Inventor: Victor Novotny, 67 Hudson St., New York, N.Y. 10013

[21] Appl. No.: 843,303

[22] Filed: Mar. 24, 1986

[51] Int. Cl.$^4$ ............................................. A63F 9/00
[52] U.S. Cl. ................................. 273/1 R; 434/127
[58] Field of Search ............... 273/1 S, 1 R; 434/127; 73/865.7

[56] References Cited

U.S. PATENT DOCUMENTS 3,797,826 3/1974 Hoener .............................. 273/1 R

OTHER PUBLICATIONS

Reader's Digest Book of 1000 Family Games, ©1971, 6-1973, p. 275.

The Way to Play, ©1975, 3-1976, p. 286.

Primary Examiner—Paul E. Shapiro
Attorney, Agent, or Firm—Bernard Malina

[57] ABSTRACT

A confectionery guessing game is provided comprising one or more edible confectionery pieces containing a flavorant material such as a flavoring agent, liquor, fruit or nut. The confectionery is held in a package and a code identifying the flavor material is attached to or contained within the package. A removable obscuring layer such as a peelable strip covers the code from view. A game participant tastes the confectionery and tries to guess the flavor material contained therein. Confirmation of that guess may be had by removing the obscuring layer from the identifying code.

24 Claims, 5 Drawing Figures

CONFECTIONERY GAME

BACKGROUND OF THE INVENTION

The invention relates to a game associated with the consumption of confectioneries and a method for playing this game.

Food and entertainment have long been successfully combined for leisure or social activities. Palate nourishment and intellectual stimulation have also proven to be attractive components of games. Food entertainment has found concrete expression in such items as fortune cookies and comic wrappered Bazooka Gum. Entertainment in the form of games involving consumption of food have also been well known. Apple dunking is a classic example. Society continues its appetite for new and more sophisticated forms of such food games.

Accordingly, it is an object of the present invention to provide a game directly involving the tasting of food.

Another object of this invention is to provide a food game playable either individually or among a group of people.

A further object of this invention is to provide a food game that challenges the organoleptic senses to identify different flavors.

These and other objects will become more apparent upon consideration of the following detailed description of the invention taken in conjunction with the accompanying drawings.

SUMMARY OF THE INVENTION

A confectionery guessing game is provided comprising:

one or more edible confectionery pieces, each of said pieces comprising a flavor material;

a package for said confectionery;

a mark identifying the flavor material wherein the mark is attached to or contained within the package; and a removeable obscuring means covering from view an answer code identifying the flavor material.

DETAILED DESCRIPTION OF THE INVENTION

Figure 1:
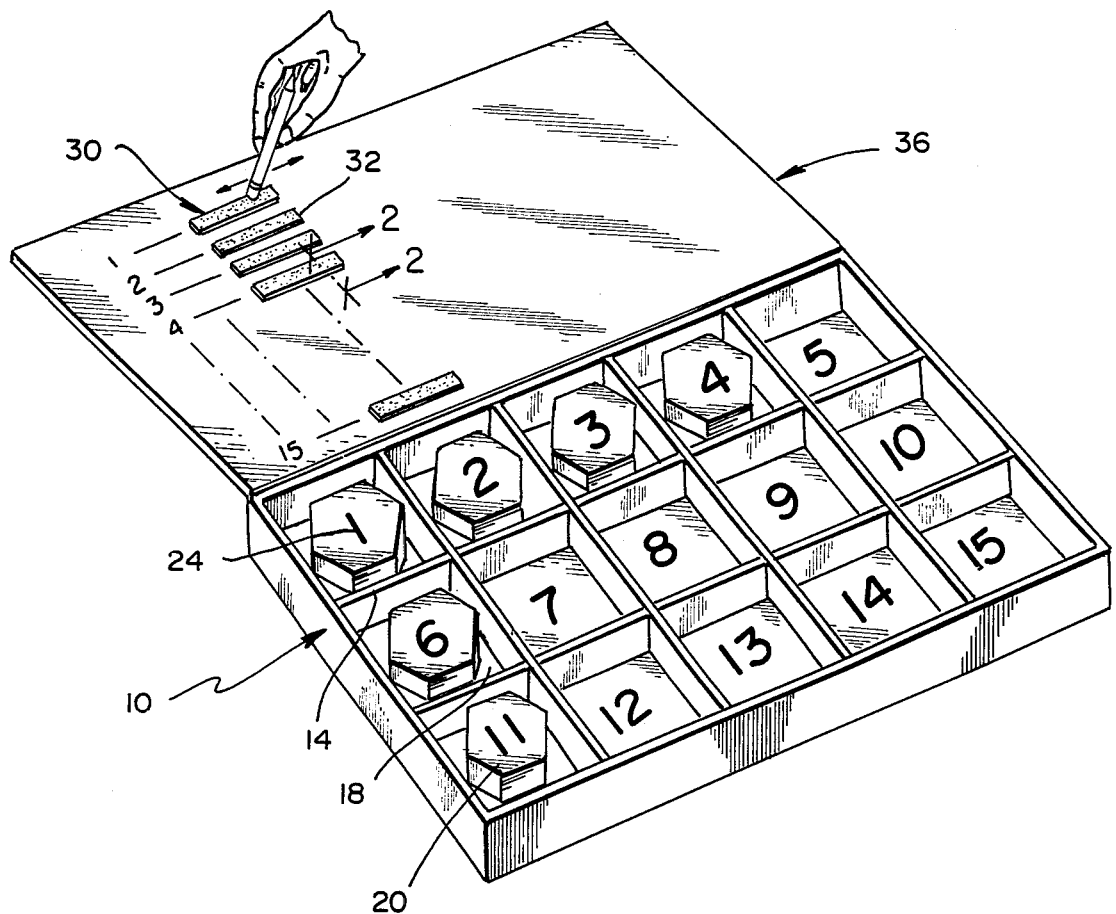
FIG. 1 is a perspective plan view of a candy box assortment illustrating one embodiment of this invention.

A first embodiment of the present invention is shown in FIG. 1. A box 10 is provided with partitions 14 in a checkerboard pattern to form compartments 18. Within each compartment there is placed a confectionery 20. The confectionery may be a chocolate, candy, gum, cookie, or similar edible sugared treat. Each confectionery piece is identified by a unique marking 24. For instance, the simplest type mark may be a number or letter. Pictorials may also be suitable for identification purposes. If pictorial, the marks may be fanciful or of some recognized object such as an animal or flower outline.

A mark may be affixed to a confectionery piece in any of a variety of ways. Marks 24 may be integrally imprinted onto the piece. For example, a chocolate may have the mark melt stamped into its body. Another method for affixing the mark is to wrap the confectionery in a protective wrapper whereupon the mark has been imprinted.

Different flavor materials are incorporated into each confectionery piece. Flavor material may be a flavoring agent such as vanilla, butterscotch, peppermint, caramel, fruit extract and the like. A flavor material, within the meaning of this invention, is not limited to flavoring agents but may also include liquors, fruits or nuts. Examples of suitable liquors are amaretto, cognac, sherry, vermouth, daiquiri, pina colada, and the like. Fruit when used as a flavor material for the confectionery may include strawberries bits, orange peels, cherries, pineapple chunks, coconut slivers, raisins, and the like. Nuts suitable as flavor materials may include cashew, peanut, macadamia, almond, pistachio, hazel, and the like.

Figure 2:
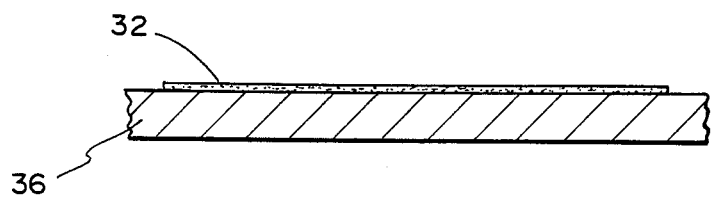
FIG. 2 is a side elevational view of the candy box lid as shown in FIG. 1, taken along the line 2—2.

Marks 24 each correspond to a flavor material which may be identified from a code list 30. Flavor identity is hidden from view by a covering 32. FIG. 2 illustrates one embodiment which is an opaque coating readily removable by rubbing with a fingernail, key or other hard edged rubbing device. The coating material may be comprised of adherent clay particles or polymer microspheres. Alternatively, the covering substrate 32 may be an adhesive peelable strip or sticker. Removal of the adhesive strip or sticker reveals the identity of the flavor material corresponding to the mark associated with a particular confectionery.

Another method for temporarily hiding the answer code utilize the confectionery itself as the obscuring means. The identity of the flavor in each confectionery piece can be printed on the inside bottom face of the compartment holding the confectionery. Upon removal of the confectionery from its compartment the identity of the flavor is revealed. Variations of this embodiment may be practiced. For instance, an opaque covering may be positioned over the identifying legend. Peelable adhesive strips or easy rub-off coatings, as in FIG. 1, may be utilized for this purpose.

Figure 3:
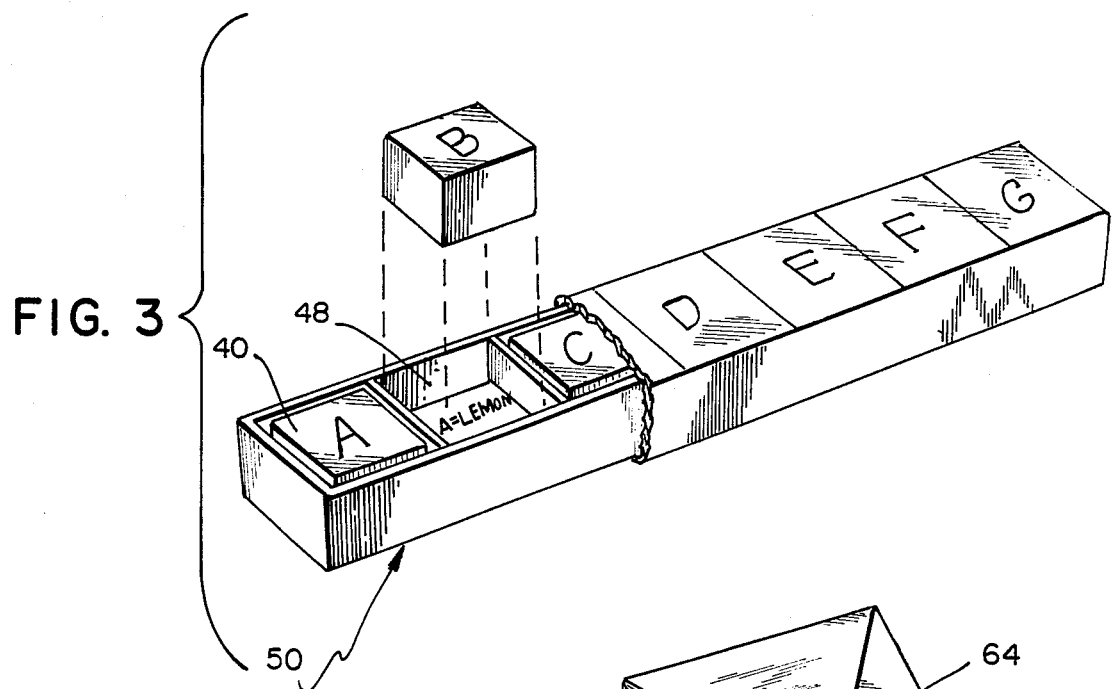
FIG. 3 is a perspective plan view of a second embodiment of this invention.

FIG. 3 shows a preferred arrangement for identifying a flavor when the answer is to be located underneath the confectionery. Confectioneries 40, with markings A, B . . . G are held each within a compartment 48 of package 50. To confirm the guess as to the flavor identity of the confectionery marked A it is necessary to remove the confectionery marked B. Underneath confectionery B, printed on the floor of the compartment, is found the answer to flavor A's identity. Similarly, to identify the flavorant in confectionery B, confectionery C must be removed. In the well of compartment C is printed the identity of the flavor in confectionery B. This pattern is continued until the last confectionery, i.e. G, is removed and tasted. Identity of the flavor corresponding to G can be located underneath confectionery G alongside the answer for F. A readily peelable tape covering the legend on the floor of the compartment may also be used to temporarily hide answers F and G. Indeed, each compartment may be fitted with peelable tape or any other readily removable opaque substrate. The extra opaque substrate serves as a second obscuring means for temporarily hiding the flavor answers.

Although the foregoing embodiment describes confectionery pieces placed in separate compartments, the present invention is not so limited. Discrete compartments need not be provided. A simple strip of paper or cardboard without compartments may serve as the package. Confectionery pieces are secured to the strip by an edible adhesive. Certain confectioneries themselves, when moistened, generate adhesive properties and may directly bond to the strip. Gum is such an example. "Strip candy" consisting of candy hemispheres attached to continuous paper rolls is well known and illustrative of this concept. It has, however, not previously been known to identify the flavor by printing its identity on the strip directly underneath the confectionery which temporarily hides the printing from view. Similar to the compartmentalized embodiment of FIG. 3, flavor answers corresponding to a confectionery piece may be placed underneath a neighboring confectionery. As an alternative labeling method, the answer key may be provided on the reverse side of the confectionery strip. With this method, flavor answers can be hidden by adhesive sheets peelably removable, or by coating rubbably removable from the strip.

Figure 4:
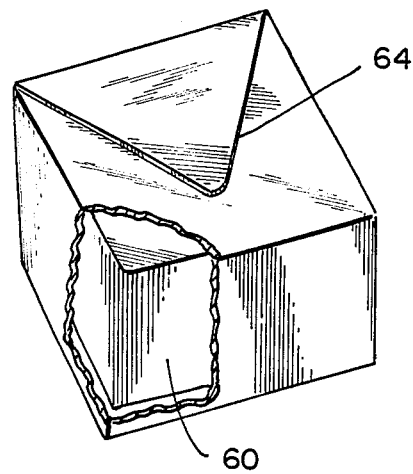
FIG. 4 is a perspective plan view of a third embodiment of this invention, shown partly in broken away section.
Figure 5:
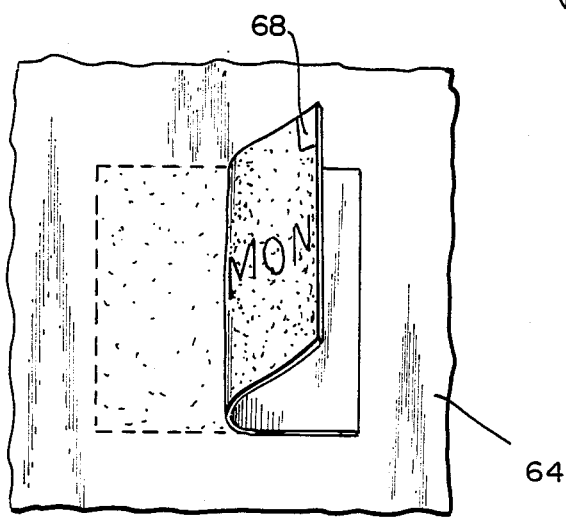
FIG. 5 is a view of the wrapper, in stretched-out form, used as packaging in FIG. 4.

Another variation of the present invention is illustrated in FIG. 4 and 5. The distinguishing feature of this embodiment is that each confectionery piece is separately packaged and its flavor identity attached thereto. Thus, FIG. 4 shows a candy 60 wrapped in a package 64. An easily removable substrate 68 may be employed to cover the legend identifying the flavorant. While the identifying legend is preferably imprinted on the wrapper, it may also be imprinted on the hidden side of a removable substrate, i.e. a peelable strip; FIG. 5 illustrates this arrangement. In FIG. 5 the confectionery is a lemon flavored candy; part of the letters LEMON can be seen as the peelable strip is removed.

A brief description of how the confectionery game is played shall now be provided. With reference to FIG. 1, the game participant chooses a confectionery, notes the number associated with that piece and then proceeds to taste the confectionery. Then the participant will attempt to guess the type of flavor material incorporated into the confectionery. This answer is then compared with the correct answer in the chart printed on cover 36 of the box in FIG. 1. If the confectionery marked "1" is chosen, the opaque substrate obscuring means covering the identity of flavor "1" is rubbed off with, for instance, a match head, to reveal the answer. For each correct answer a point is awarded. The participant having the greatest number of points after all confectionery pieces have been eaten, is declared the winner. The game may also be played in solitaire form where there is only one participant.

While preferred embodiments of this invention have been shown and described herein, it is obvious that numerous additions, changes and omissions may be made in such embodiments without departing from the spirit and scope of the invention.

What is claimed is:

1. A confectionery guessing game comprising:
   one or more edible confectionery pieces, each of said pieces comprising a flavor material;
   a package for said confectionery;
   a mark identifying said flavor material, said mark being included with said package; and
   a removable obscuring means covering from view an answer code identifying said flavor material.

2. A game according to claim 1 wherein said flavor material is selected from the group consisting of flavoring agents, liquors, fruits and nuts.

3. A game according to claim 1 wherein said confectionery is selected from the group consisting of candy, cookies, gum and chocolates.

4. A game according to claim 1 wherein said obscuring means is a peelable adhesive strip.

5. A game according to claim 1 wherein said obscuring means is a cover layer readily removable by rubbing-off with a hard object.

6. A game according to claim 1 wherein said mark is selected from the group consisting of numbers, letters and pictorials.

7. A game according to claim 1 wherein said obscuring means is said confectionery itself.

8. A game according to claim 1 wherein said package has two or more compartments.

9. A game according to claim 1 wherein said package is a strip of paper.

10. A game according to claim 1 wherein there is a single confectionery and said package is a wrapper surrounding said confectionery.

11. A game according to claim 10 wherein said identifying mark is imprinted on said wrapper.

12. A game according to claim 10 wherein said mark is imprinted on an adhesive strip peelably bound to said wrapper and said mark being on a surface of said peelable strip contacting said wrapper and thereby hiding said mark.

13. A game according to claim 1 wherein said package is a strip of cardboard.

14. A method of playing a game comprising:
   (i) choosing a confectionery piece containing a flavor material, said confectionery held in a package having a mark identifying said flavor material incorporated with said package;
   (ii) tasting said confectionery;
   (iii) guessing the identity of said flavor material; and
   (iv) checking the correct identity of said flavor material by removing an obscuring means hiding from view an answer code identifying said flavor material.

15. A method according to claim 14 wherein said flavor material is selected from the group consisting of flavoring agents, liquors, fruits and nuts.

16. A method according to claim 14 wherein said confectionery is selected from the group consisting of candy, cookies, gum and chocolates.

17. A method according to claim 14 wherein said obscuring means is a cover layer readily removable by rubbing-off with a hard object and said step of checking the correct identity of said flavor material comprises rubbing-off said cover layer.

18. A method according to claim 14 wherein said obscuring means is said confectionery itself.

19. A method according to claim 14 wherein said package has two or more compartments.

20. A method according to claim 14 wherein said package is a strip of paper.

21. A method according to claim 14 wherein there is a single confectionery and said package is a wrapper surrounding said confectionery.

22. A method according to claim 21 wherein said identifying mark is imprinted on said wrapper.

23. A method according to claim 21 wherein said mark is imprinted on an adhesive strip peelably bound to said wrapper and said mark being on a surface of said peelable strip contacting said wrapper and thereby hiding said mark and said step of checking the correct identity of said flavor material comprises peeling away said adhesive strip.

24. A method according to claim 14 wherein said package is a strip of cardboard.

* * * * *